United States Statutory Invention Registration [19]

[11] Reg. Number: H548

Holliday et al.

[43] Published: Nov. 1, 1988

[54] GROUP ORTHOGONAL ARRAYS FOR ELIMINATION OF MULTIPLE-TIME-AROUND ECHOS IN RADARS

[75] Inventors: Edward Holliday; Glenn D. Weathers, both of Huntsville, Ala.

[73] Assignee: The United States of America as represented by the Secretary of the Army, Washington, D.C.

[21] Appl. No.: 633,091

[22] Filed: Dec. 7, 1987

[51] Int. Cl.[4] ..... G01S 7/44

[52] U.S. Cl. ..... 342/204; 342/145

*Primary Examiner*—Stephen C. Buczinski
*Assistant Examiner*—Linda J. Wallace
*Attorney, Agent, or Firm*—John C. Garvin, Jr.; Freddy M. Bush; Robert C. Sims

[57] ABSTRACT

Sets of group-complementary code arrays which have the property of being mutually orthogonal over a subinterval of their total cross-correlation function have been identified. These group-orthogonal arrays are generated by a multiplication operation upon a given group-complementary array using a matrix which has diagonal elements from vectors which are orthogonal. Composite code arrays are synthesized by interleaving rows from the group-orthogonal set of arrays, and applying the resulting rows of codes to bi-phase modulate pulses in bursts. The resulting composite waveform has the desirable property of temporal (zero-Doppler) sidelobe cancellation in the maximum unambiguous range interval and response cancellation over one or more multiple-time-around range intervals of an equivalent uncoded pulse sequence. The waveforms also have the property of maximizing the receiver response in one of the multiple-time-around range intervals, while achieving response cancellation in the maximum unambiguous range interval of an equivalent uncoded pulse sequence.

2 Claims, 3 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

GROUP ORTHOGONAL ARRAYS FOR ELIMINATION OF MULTIPLE-TIME-AROUND ECHOS IN RADARS

DEDICATORY CLAUSE

The invention described herein may be manufactured, used, and licensed by or for the Government for governmental purposes without the payment to us of any royalties thereon.

BACKGROUND OF THE INVENTION

The unique application of group-complementary and group-orthogonal arrays to radar waveform design allows sidelobe control not only in the principal unambiguous range interval, but also in multiple time around range intervals. Previous waveform designs concentrated on controlling responses in the principal unambiguous range interval, and usually responses for multiple time around range intervals were identical to those of the first time around range interval. Interleaved group-orthogonal/group complementary arrays provides sidelobe cancellation in the principal unambiguous range interval as well as for complete sidelobe cancellation in one or more multiple time around range intervals. The uniqueness of this waveform design, compared to previous designs is that it simultaneously controls near-in sidelobes as well as far-out sidelobes in multiple time around intervals. Also, a unique aspect of this design is that it allows for placing the maximum response in a multiple time around interval while providing cancellation of responses from nearer-in range intervals including the principal unambiguous range interval.

The advantage of interleaved group-orthogonal/-group complementary arrays lies in their property of sidelobe cancellation over multiple range intervals. This results in reduced clutter interference when tracking low speed targets in clutter. With this waveform, a high PRF can be used to increase energy on target or increase Doppler coverage, and allows detection and tracking of targets in multiple time around range intervals with cancellation of clutter responses form the principal unambiguous range interval and from other multiple time around range intervals.

SUMMARY OF THE INVENTION

Sets of group-complementary code arrays which have the property of being mutually orthogonal over a subinterval of their total cross-correlation function have been identified. These group-orthogonal arrays are generated by a multiplication operation upon a given group-complementary array using a matrix which has diagonal elements from vectors which are orthogonal. Walsh vectors are examples of such orthogonal vectors. Composite code arrays are synthesized by interleaving rows from the group-orthogonal set of arrays, and the resulting rows of codes are applied to bi-phase modulate pulses in bursts. The resulting composite waveform has the desirable property of temporal (zero-Doppler) sidelobe cancellation in the maximum unambiguous range interval and response cancellation over one or more multiple-time-around range intervals of an equivalent uncoded pulse sequence. The waveforms also have the property of maximizing the receiver response in one of the multiple-time-around range intervals, while achieving response cancellation in the maximum unambiguous range interval of an equivalent uncoded pulse sequence.

DETAILED DESCRIPTION OF THE PREFERRED EMBODIMENT

Figure 1:
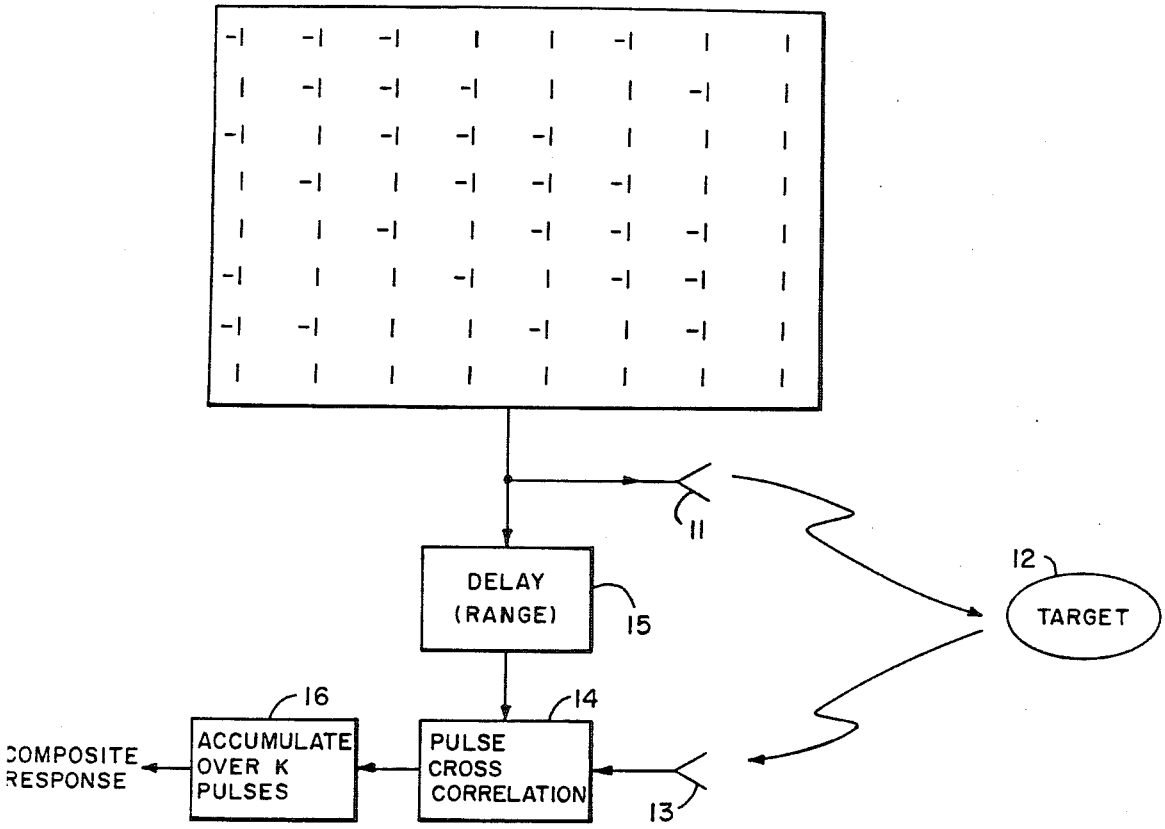
FIG. 1 is a schematic of radar processing with group-complementary codes.

Group-Complementary arrays can be produced which provide for the temporal distribution of carrier phase in each transmitted pulse through binary coding. These are applied to synthesize a radar waveform with the desirable property of temporal sidelobe cancellation (G. Weathers, and E. M. Holliday, "Group-Complementary Array Coding for Radar Clutter Rejection," IEEE Transactions and Aerospace and Electronic Systems, AES-19, No. 3, pp. 369–379, May 1983). FIG. 1 illustrates the cross-correlation process in the receiver. The group-complementary array is a code set of K pulses. Each row codes (bi-phase) a single pulse. Included in the figure is a single burst composed of rows of shifted maximum-length sequences, with a final "all 1" row and column. Each row bi-phase codes a single pulse, and the receiver summation is over K pulses corresponding to the K rows of the code array. The code 10 is transmitted by antenna 11 to target 12. The reflection is received by antenna 13, correlated by correlation 14 in accordance with range delayed 15 code and accumulation in 16.

Figure 2:
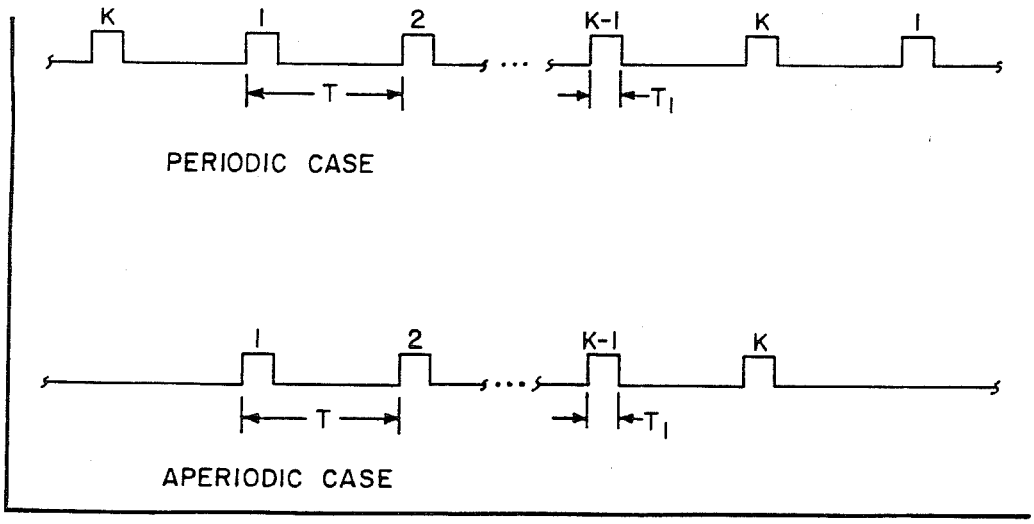
FIG. 2 is a pulse sequence timing diagram.

The algebraic property which results in zero-valued temporal sidelobes holds in the maximum unambiguous range interval of the equivalent uncoded pulse sequence, $\pm(T-T_1)$, where T is the pulse repetition interval and $T_1$ is the pulse width. FIG. 2 is a timing diagram of the coded pulse sequence for the periodic and aperiodic cases, where each pulse is numbered corresponding to the row from the code array which bi-phase modulates that pulse.

Figure 3:
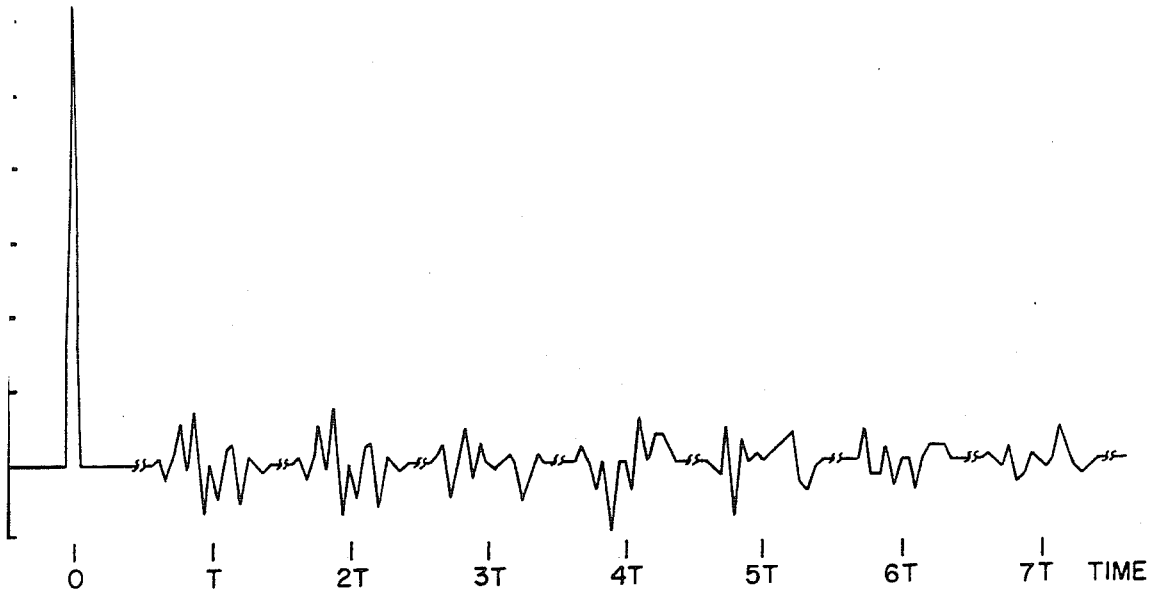
FIG. 3 shows transmit/reference waveforms—aperiodic cross-correlation.

FIG. 3 gives the transmit/reference waveforms aperiodic correlation function for the group complementary array from FIG. 1. Temporal sidelobes are seen to cancel over the temporal range interval of $\pm(T-T_1)$, but sidelobes do exist at multiple-time-around range intervals centered around $\pm T, \pm 2T, \ldots, \pm(K-1)T$.

The rows of a group-complementary array can be interchanged without affecting the temporal sidelobe cancellation property in the interval $\pm(T-T_1)$.

| | | | | | | | |
|---|---|---|---|---|---|---|---|
| −1 | −1 | −1 | 1 | 1 | −1 | 1 | 1 |
| 1 | 1 | 1 | 1 | 1 | 1 | 1 | 1 |
| −1 | −1 | 1 | 1 | −1 | 1 | −1 | 1 |
| 1 | −1 | −1 | −1 | 1 | 1 | −1 | 1 |
| 1 | 1 | −1 | 1 | −1 | −1 | −1 | 1 |
| −1 | 1 | −1 | −1 | −1 | 1 | 1 | 1 |
| −1 | 1 | 1 | −1 | 1 | −1 | −1 | 1 |
| 1 | −1 | 1 | −1 | −1 | −1 | 1 | 1 |

Figure 4:
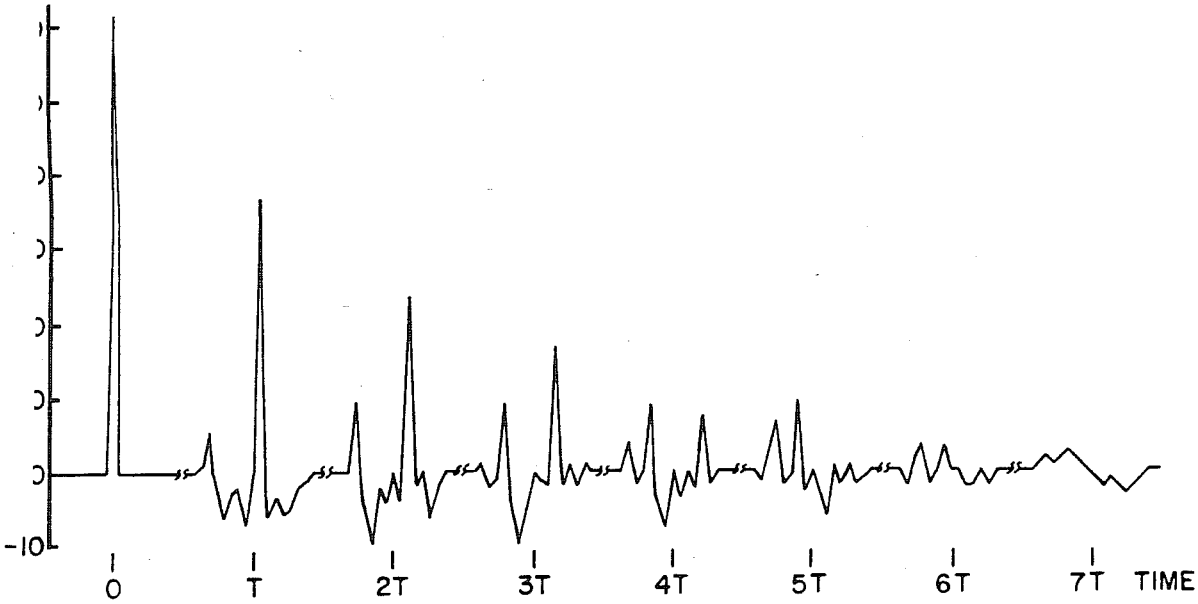
FIG. 4 shows transmit/reference waveforms—aperiodic cross-correlation.

The array from interchanging several rows of the array in FIG. 1. FIG. 4 gives the aperiodic correlation function for this array. The peak sidelobes are seen to be smaller than for the previous example, however still relatively large.

In many cases, it is beneficial to eliminate the temporal sidelobes from multiple-time-around range intervals. It will be shown that the group-complementary array's property of temporal sidelobe cancellation in the $\pm(T-T_1)$ interval can be extended to multiple-time-around intervals through an array synthesis procedure which utilizes a "group-orthogonality" property of certain sets of group-complementary arrays. This extension applies to both the periodic and aperiodic cross-correlation functions.

GROUP-ORTHOGONAL ARRAYS

A single group-complementary array can be operated upon to generate a set of group-complementary arrays which have a group-orthogonality property. That is, each array in the set is orthogonal to all other arrays in the set over a $\pm(T-T_1)$ interval of the cross-correlation two pulse-sequences which are coded by any two arrays from the set.

The method of generating a group-orthogonal array, $A_z$, from a group-complementary array, $A_0$, is to perform a matrix multiplication $$A_z = A_0 V_z \tag{1}$$

where $A_0$ is a K row by N column array, and $V_z$ is an N by N diagonal array of the form $$V_z = \begin{matrix} V_z(1) & 0 & 0 & \dots & 0 \\ 0 & V_z(2) & 0 & \dots & 0 \\ 0 & 0 & V_z(3) & \dots & 0 \\ . & . & . & \dots & . \\ 0 & 0 & 0 & \dots & V_2(N). \end{matrix} \tag{2}$$

Even though we consider only the case where N=K, (with K being a power of 2), group-orthogonal arrays exist for any even N. For $N=K=2^n$, the diagonal elements of $V_z$ will be elements of Walsh vectors. Each Walsh vector (index z) used in $V_z$ to form $A_z$ results in a new array which is set group-orthogonal to $A_0$. Also the arrays generated from a set of Walsh vectors will be group-orthogonal to each other.

As an example, consider the group-complementary array $$A_o = \begin{matrix} -1 & -1 & 1 & 1 \\ 1 & -1 & -1 & 1 \\ -1 & 1 & -1 & 1 \\ 1 & 1 & 1 & 1. \end{matrix} \tag{3}$$

A set of group-complementary arrays which are also group-orthogonal can be generated from the Walsh vectors, $W_z$ $$W_1 = 1\ 1\ -1\ -1 \tag{4}$$

$$W_2 = 1\ -1\ 1\ -1 \tag{5}$$

and $$W_3 = -1\ 1\ 1\ -1 \tag{6}$$

then $$V_1 = \begin{matrix} 1 & 0 & 0 & 0 \\ 0 & 1 & 0 & 0 \\ 0 & 0 & -1 & 0 \\ 0 & 0 & 0 & -1 \end{matrix} \tag{7}$$

$$V_2 = \begin{matrix} 1 & 0 & 0 & 0 \\ 0 & -1 & 0 & 0 \\ 0 & 0 & 1 & 0 \\ 0 & 0 & 0 & -1 \end{matrix} \tag{8}$$

and $$V_3 = \begin{matrix} -1 & 0 & 0 & 0 \\ 0 & 1 & 0 & 0 \\ 0 & 0 & 1 & 0 \\ 0 & 0 & 0 & -1 \end{matrix} \tag{9}$$

The resulting group orthogonal arrays are $$A_1 = \begin{matrix} -1 & -1 & -1 & -1 \\ 1 & -1 & 1 & -1 \\ -1 & 1 & 1 & -1 \\ 1 & 1 & -1 & -1, \end{matrix} \tag{10}$$

$$A_2 = \begin{matrix} -1 & 1 & 1 & -1 \\ 1 & 1 & -1 & -1 \\ -1 & -1 & -1 & -1 \\ 1 & -1 & 1 & -1 \end{matrix} \tag{11}$$

and $$A_3 = \begin{matrix} 1 & -1 & 1 & -1 \\ -1 & -1 & -1 & -1 \\ 1 & 1 & -1 & -1 \\ -1 & 1 & 1 & -1 \end{matrix} \tag{12}$$

Figure 5:
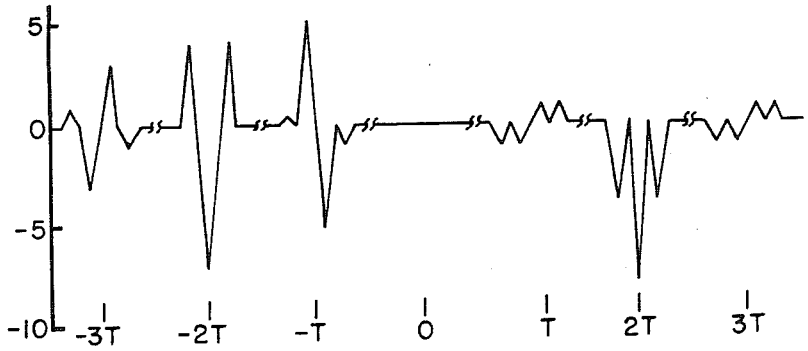
FIG. 5 shows cross-correlation between A0 and A3.

The four arrays, $A_0$, $A_1$, $A_2$, and $A_3$, for a group-orthogonal set of arrays. FIG. 5 is the cross-correlation function for $A_0$ and $A_3$, and illustrates the orthogonality of the two arrays over the interval $\pm(T-T_1)$.

For $N=2^n$, the number of arrays in a group-orthogonal set, S, is $$S=N, \tag{13}$$

corresponding to the N Walsh vectors which can be applied in (2).

The group-orthogonal array set synthesis procedure given utilizes group-complementary arrays in the form of Hadamard matrices with the sign pattern of a Walsh vector operating on columns of the original array.

CANCELLATION OF MULTIPLE-TIME-AROUND RESPONSES

A group-orthogonal set of group-complementary arrays can be used to synthesize composite transmitted and reference code arrays. The cross-correlation of these two resulting arrays will have the property of temporal sidelobe cancellation over the maximum unambiguous range interval, and over one or more multiple-time-around range intervals.

The synthesis procedure for the composite code arrays is to interleave rows from the arrays of the group-orthogonal sets to bi-phase modulate K bursts of pulses, with up to S pulses in each burst. The K bursts will be separated by a time interval equal to one or more pulse-repetition intervals, depending on the number of multiple-time-around intervals which are to have temporal responses cancelled. The resulting K*S pulse sequence can be utilized as the radar waveform on a periodic or aperiodic basis. The composite receiver response is formed from the sum of the K*S pulses or upon integer multiples of K*S pulses.

As an example of this synthesis procedure, the group orthogonal arrays $A_0$, $A_1$, $A_2$, and $A_3$ given by equations (3), (10), (11), and (12) respectively will be the basis for the synthesis of a composite waveform. The composite code formed from interleaving rows from $A_0$, $A_1$, $A_2$, and $A_3$ is $$C_T = C_R = \begin{matrix} -1 & -1 & 1 & 1 \\ -1 & -1 & -1 & -1 \\ -1 & 1 & 1 & -1 \\ 1 & -1 & 1 & -1 \\ 1 & -1 & -1 & 1 \\ 1 & -1 & 1 & -1 \\ 1 & 1 & -1 & -1 \\ -1 & -1 & -1 & -1 \\ -1 & 1 & -1 & 1 \\ -1 & 1 & 1 & -1 \\ -1 & -1 & -1 & -1 \\ 1 & 1 & -1 & -1 \\ 1 & 1 & 1 & 1 \\ 1 & 1 & -1 & -1 \\ 1 & -1 & 1 & -1 \\ -1 & 1 & 1 & -1 \end{matrix} \tag{14}$$

Figure 6:
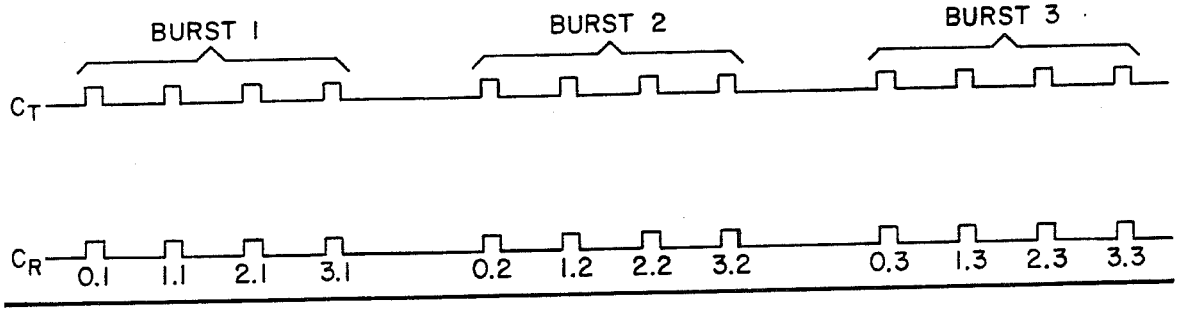
FIG. 6 is a timing diagram for transmitted ($C_T$) and reference ($C_R$) coded pulse sequences.
Figure 7:
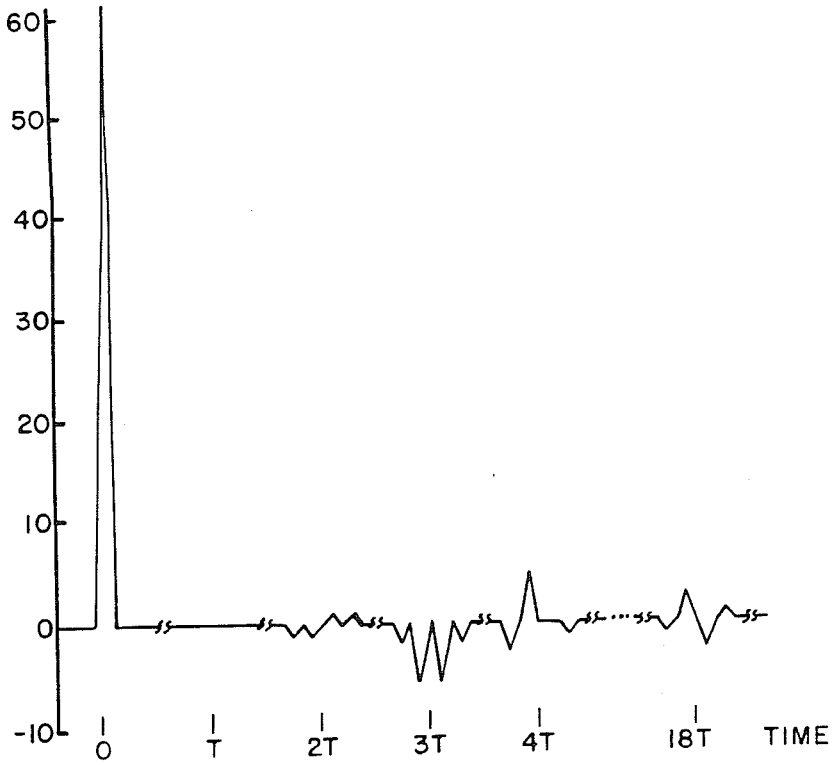
FIG. 7 shows cross-correlation between $C_T$ and $C_R$.

The timing diagram corresponding to transmitter code, $C_T$, and reference code, $C_R$, is shown in FIG. 6, and FIG. 7 gives the cross-correlation between $C_T$ and $C_R$. This cross-correlation function corresponds to the zero-Doppler cut of the waveform's cross-ambiguity function. As can be seen from the figure, temporal sidelobes have been cancelled over the maximum unambiguous range interval and over the second-time-around range interval of an equivalent, but uncoded, pulse sequence.

Observe that the waveform shown as $C_T$ and $C_R$ could, by timing of $C_R$, be used to place the maximum cross-correlation response in the second-time-around range interval (for an uncoded pulse sequence with the same pulse repetition interval), with zero response (for zero-Doppler offset) in the maximum unambiguous range interval, and in the third-time-around range interval. This radar waveform and processing could be useful for detecting targets in the second-time-around range interval, while reducing clutter interference from clutter sources in the maximum unambiguous range interval.

For the example given, the time between each burst of four pulses is 2T. If this period is increased to 3T, then sidelobe cancellation is extended to the third-time-around range interval for the equivalent uncoded pulse sequence, and so on.

We claim:

1. In a radar system for detecting a target in which a plurality of pulses with a carrier are transmitted and reflection of those pulses from the target are received, the improvement comprising the method of arranging the temporal distribution of carrier phase in each transmitted pulse by biphased binary coding; utilizing a set of at least two different group-orthogonal arrays for a series of at least eight transmitted pulses; and providing a corresponding reference set of arrays and combining them in a range gate manner with the reflection of the transmitted pulses whereby crosscorrelation sidelobes of multiple time around reflections from the target are cancelled.

2. A method as set forth in claim 1 wherein said set of group-orthogonal arrays are generated by a multiplication operation upon a given group-complementary array using a matrix which has diagonal elements from vectors which are orthogonal.

* * * * *